350-173 SEARCH ROOM

July 28, 1970 TOSHIRO KISHIKAWA 3,521,944
RELAY OPTICAL SYSTEM FOR COLOR TELEVISION
CAMERA HAVING FOUR LIGHT PATHS
Filed June 14, 1967 2 Sheets-Sheet 1

INVENTOR.
TOSHIRO KISHIKAWA
BY
Burgess and Archer
ATTORNEYS

July 28, 1970 TOSHIRO KISHIKAWA 3,521,944

RELAY OPTICAL SYSTEM FOR COLOR TELEVISION CAMERA HAVING FOUR LIGHT PATHS

Filed June 14, 1967 2 Sheets-Sheet 2

INVENTOR.
TOSHIRO KISHIKAWA
BY
Buckman and Archer
ATTORNEYS

United States Patent Office 3,521,944

Patented July 28, 1970

3,521,944

RELAY OPTICAL SYSTEM FOR COLOR TELEVISION CAMERA HAVING FOUR LIGHT PATHS

Toshiro Kishikawa, Saitama-ken, Japan, assignor to Fuji Shashin Koki Kabushiki Kaisha, Saitama-ken, Japan Filed June 14, 1967, Ser. No. 645,967
Int. Cl. G02b 27/10
U.S. Cl. 350—173 2 Claims

ABSTRACT OF THE DISCLOSURE

A compact relay optical system for color television camera having arranged in its light path of color channel a compound prism composed of a pentagonal prism and prisms attached to two surfaces of said pentagonal prism through the intermediary of an interference film having beam splitting power.

The present invention relates to a relay optical system for color television camera having four light paths.

The primary object of the present invention is to provide a color television camera which may be produced in more compact form than conventional ones.

These and other objects and advantages of the present invention will become apparent from the following detailed description when taken in conjunction with the accompanying drawings, in which.

Figures 1, 2, 3, 4:
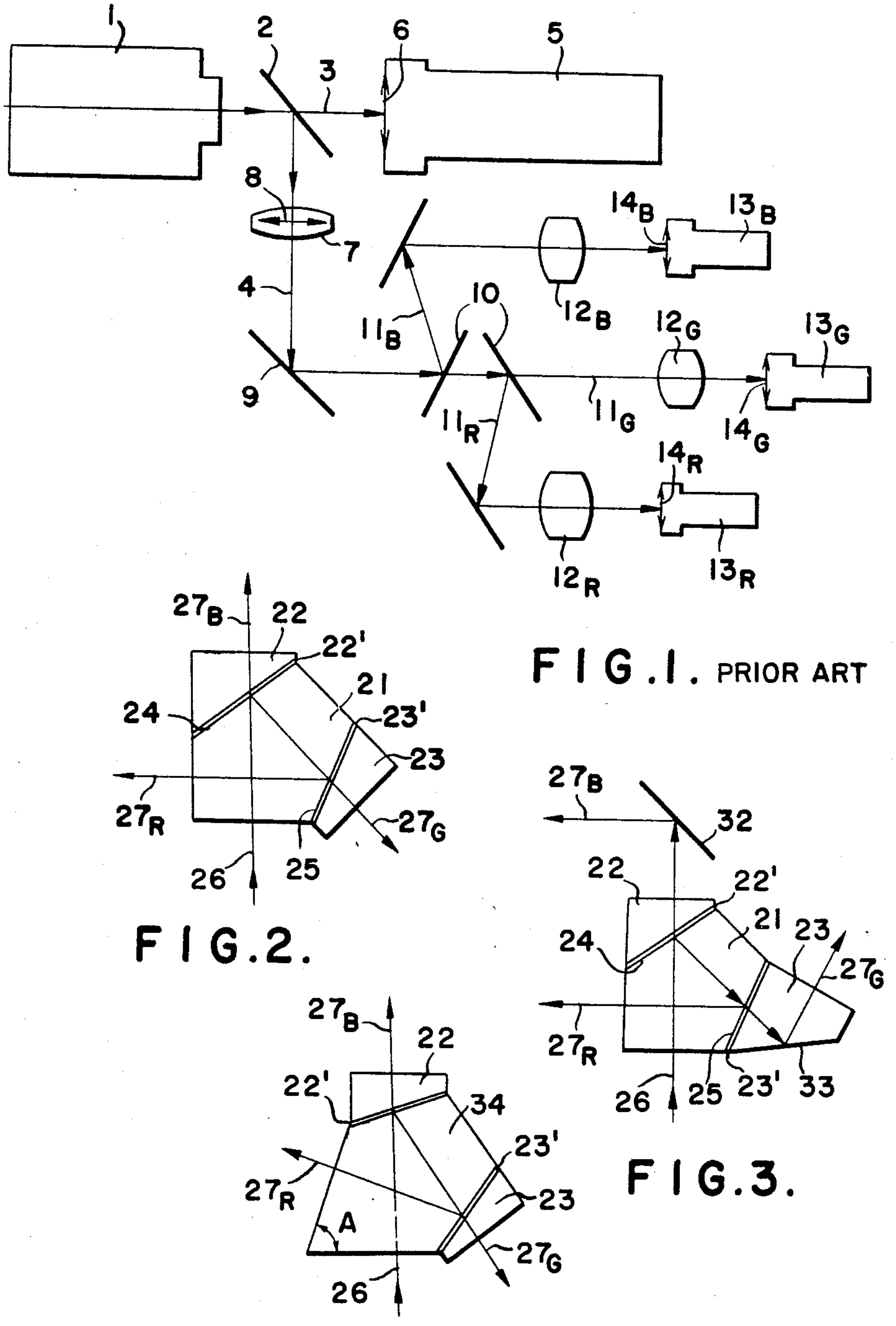
FIG. 1. PRIOR ART, FIG. 2., FIG. 3., FIG. 4.
FIG. 1 is a diagrammatic view showing the relay optical system of a conventional color television camera.
FIGS. 2 to 4 are diagrammatic views showing various forms of the compound prism as used in the present invention.

Referring to FIG. 1, there is shown a typical example of the optical system of conventional color television cameras. A taking lens 1 has a relatively long back focus and light passing through the lens 1 reaches a translucent film 2 and a part of the light passes through said film 2 to be a luminance channel 3, while the remainder thereof is reflected by said film 2 to be chromatic channel 4. The light proceeding along the light path 3 of luminance channel reaches directly the photoelectric surface 6 of an image pickup tube 5 in the luminance channel, without passing through any relay lens, to form an image thereon.

The light proceeding along the light path 4 of the chromatic channel forms on a plane coinciding with the principal plane of a field lens 7 an image 8 conjugate with the image 6. The light of the chromatic channel proceeds further and is reflected rearwardly by means of a reflector 9 and then split into three colors by dichroic mirrors 10, which colors respectively constitute a blue channel light path 11B, green channel light path 11G and red channel light path 11R. The lights proceeding along the light paths 11B, 11G and 11R pass through relay lenses 12B, 12G and 12R respectively and form images on the photoelectric surfaces of respective image pickup tubes 13B, 13G and 13R. Such a relay optical system has a drawback that a camera having said optical system arranged on one plane as shown in FIG. 1 becomes large in size in both transverse and longitudinal directions. This is because a large space is required to retain the reflector 9, dichroic mirrors 10 and the light paths of the three chromatic channels in a spaced relation.

The present invention contemplates to eliminate the foregoing drawback of the conventional relay optical system for color television camera. Namely, according to the present invention, it is possible to eliminate the reflector 9 and dichroic mirrors 10 by the use of a novel compound prism and thereby to make the camera compact as a whole. By employing the present invention, the size of a color television camera having four light paths can be substantially reduced to that of a monochromatic camera which has only one light path.

The present invention will be described in further detail in terms of a preferred embodiment thereof hereunder. One form of the compound prism as used in the present invention is shown in FIG. 2. As can be seen in the figure, the compound prism includes a pentagonal prism 21 and prisms 22 and 23 attached to the opposite surfaces 24 and 25 respectively of said prism 21. Between the contact surfaces of the prisms 21 and 22 is interposed a film 22' which permits only blue light to pass therethrough reflecting all other lights, and similarly between the contact surfaces of the prisms 21 and 23 is interposed a film 23' which reflects red light only passing all other lights therethrough. Thus, it will be understood that, when an incident ray enters the pentagonal prism 21 along a light path 26 and reaches the film 22' on the surface 24, blue light only is permitted to pass through said film to proceed along a light path 27B, the rest of the component color lights, i.e. green light and red light, being reflected and reach the film 23' on the surface 25. Upon reaching the film 23', the green light only is permitted to pass therethrough to proceed along a light path 27G and the remaining red light is reflected by said film and proceeds along a light path 27R. Another form of the compound prism usable in the present invention is shown in FIG. 3. In this form of the compound prism, while the pentagonal prism 21 and the prism 22 are the same as those shown in FIG. 2, the prism 23 has a reflecting plane 33 arranged in the light path 27G of the green light, so that the green light is reflected by the plane 33 in the manner shown. The blue light 27B having passed through the film 22' is reflected by a reflector 32 to proceed in a direction parallel to the direction in which the red light proceeds.

As will be clear from the figures, the compound prism of the present invention described above achieves a function equivalent to that performed by that portion of the arrangement shown in FIG. 1 wherein light passes from the field lens 7 to the relay lenses 12B, 12G and 12R including the reflector 9 and the dichroic mirrors 10, and yet is far more compact than the latter.

In general, a larger incident angle with respect to the plane of a dichroic film results in a greater difference in color rendition on the opposite sides of a screen and a stronger polarization. With the arrangement shown in FIG. 1, the incident angle can be made small only to about 38 degrees due to the geometrical arrangement of the dichroic mirrors 10. With the use of the compound prism of the present invention, in contrast thereto, the angle of incidence may be made small to about 22.5 degrees in glass corresponding to 34° in air and, when the angle of incidence for one of the films 22' and 23' is 38 degrees in air, that for the other can be made as small as 30 degrees in air.

FIG. 4 shows still another form of the compound prism usable in the present invention, which comprises a pentagonal prism 34 having a vertical angle A smaller than those of the prisms 21 shown in FIGS. 2 and 3. With this compound prism, the angle of incidence for the films 22' and 23' may be made further smaller than the preceding forms.

Figures 5, 6, 7:
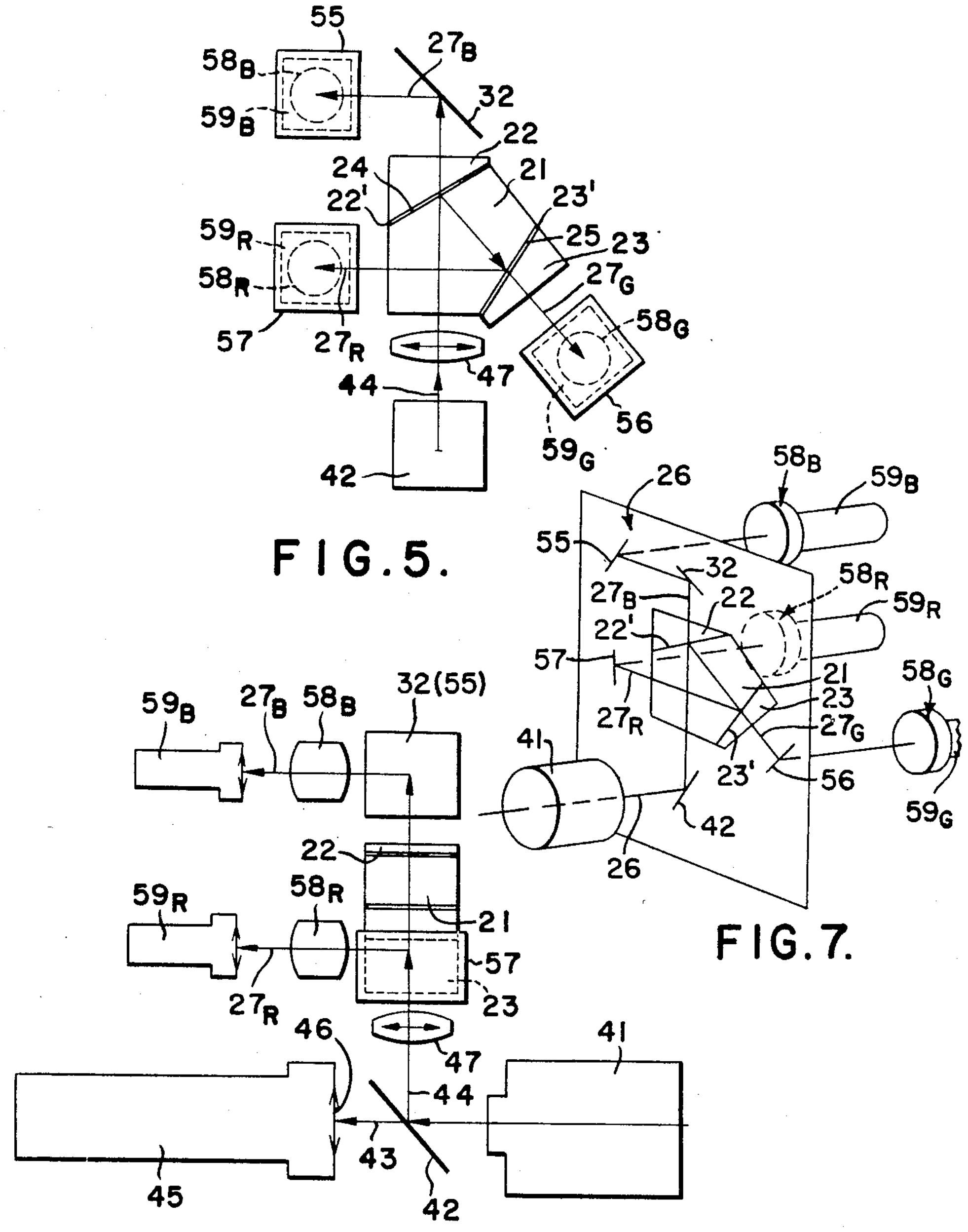
FIGS. 5 and 6 are a diagrammatic front view and a diagrammatic side view of the optical system of a color television camera using the composite prism shown in FIG. 2, respectively.
FIG. 7 is a diagrammatic view of the optical system of a colored camera shown in FIG. 5.

An optical system of a color television camera using the compound prism shown in FIG. 2 is illustrated in FIGS. 5 and 6. As can be seen from the figures, the light from a taking lens 41 reaches a translucent reflector 42, and a part of the light is permitted to pass through said reflector 42 to proceed along a light path 43 and forms an image on the photoelectric surface 46 of an image pickup tube 45 in the luminance channel. The remainder of the light is reflected by the reflector 42 to proceed along a light path 44 and forms an image on a field lens 47.

The light passing through the field lens 47 enters the pentagonal prism 21 constituting the compound prism and reaches the film 22', whereupon the blue light only is permitted to pass through said film and remaining component lights, i.e. green light and red light, are reflected and abutted to the film 23'. The film 23' passes only the green light therethrough reflecting the red light to cause it to proceed to the outside of the prism 21. The blue light having been filtered by the film 22' and leaving the compound prism is reflected by a reflector 32 to proceed along the light path 27B, reflected again by a reflector 55 to pass through a relay lens 58B and forms an image on an image pickup tube 59B in the blue channel. On the other hand, the light having been filtered by the film 23' is reflected by a reflector 56 (indicated by the solid line in FIG. 5) and, after passing through the relay lens 58G, forms an image on an image pickup tube 59G in the green channel. The red light reflected by the film 23' is further reflected by a reflector 57 and, after passing through the relay lens 58R, forms an image on an image pickup tube 59R in the red channel. In FIG. 7, the optical system of FIGS. 2, 5 and 6 is illustrated diagrammatically and as shown therein, reference numeral 41 is the taking lens, and reference numerals 58B, 59B; 58R, 59R; and 58G and 59G respectively represent the relay lens and blue, red and green color image pickup tubes. Pentagonal prism 21 has prisms 22 and 23 attached to opposite surfaces (see 24 and 25 of FIG. 5). The beam travelling along light path 26 is reflected off reflector 42 into the compound prism and light path 27B represents the blue light which is only permitted to pass through the film 22'. In a like manner, only green light is permitted to pass through the film 23', the red light being reflected by the compound prism so that it exits and is subsequently reflected into associated red relay lens and pickup tube (58R and 59R). Other reflectors 42, 55, 32, 56 represented by straight lines in the schematic view also serve to further reflect the mirror light beams in directions which ultimately make the red, blue and green beams parallel to each other and the optical axis of the light beam 26. The illustrated plane being perpendicular to the optical axis of the beam 26. In FIG. 6, although the reflector 56, relay lens 58G and image pickup tube 59G for the green channel are omitted merely for the purpose of simplicity, it will be clear from FIG. 5 that the three image pickup tubes 59B, 59G and 59R are arranged in parallel to the image pickup tube 45 in the luminance channel. It will be apparent from comparison of FIGS. 5 and 6 with FIG. 1, that it is possible according to the present invention to produce a color television camera which is markedly compact as compared with the conventional one.

What is claimed is:

1. A compact relay optical system for a color television camera having a taking lens and a compound prism, comprising a pentagonal prism, and two prisms attached to two surfaces of said pentagonal prism and interference films having beam splitting power disposed between the contacting surfaces of said pentagonal prism and said two prisms, said compound prism being arranged such that it splits a light beam passing through said taking lens into three primary color paths in a plane perpendicular to the optical axis of the taking lens and reflecting mirrors adjacent said compound prism adapted to receive and direct said three primary color paths parallel to each other and to the axis of said taking lens so that said three primary color paths are disposed about and in close proximity to said compound prism when viewed in line with the axis of said taking lens whereby said color television camera optical system is rendered small in size and relatively compact.

2. The compact relay optical system according to claim 1 wherein said two surfaces of said pentagonal prism form an acute incident angle of about 22.5 degrees.

References Cited

UNITED STATES PATENTS

| | | | |
|---|---|---|---|
| 3,017,454 | 1/1962 | James et al. | 178—5.4 |
| 3,255,304 | 6/1966 | Bendell et al. | 178—5.4 |
| 2,971,051 | 2/1961 | Back | 350—173 |
| 3,333,053 | 7/1967 | Back | 350—173 |

DAVID SCHONBERG, Primary Examiner

R. L. SHERMAN, Assistant Examiner